United States Patent
Brazeau et al.

(10) Patent No.: US 12,105,835 B2
(45) Date of Patent: Oct. 1, 2024

(54) EFFICIENT API WITH PRIVACY PROTECTION

(71) Applicant: salesforce.com, inc., San Francisco, CA (US)

(72) Inventors: Jeremiah David Brazeau, Hudson, NH (US); Victor Manuel Romero Carrasco, Malaga (ES); Christopher David Boran, Burlington, MA (US); Andre Huss, San Francisco, CA (US); Pallav Kothari, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 167 days.

(21) Appl. No.: 17/224,307

(22) Filed: Apr. 7, 2021

(65) Prior Publication Data

US 2021/0406397 A1    Dec. 30, 2021

Related U.S. Application Data

(60) Provisional application No. 63/046,135, filed on Jun. 30, 2020.

(51) Int. Cl.
*G06F 21/62* (2013.01)
*G06F 9/54* (2006.01)

(52) U.S. Cl.
CPC .......... *G06F 21/6245* (2013.01); *G06F 9/547* (2013.01)

(58) Field of Classification Search
CPC .............................. G06F 21/6245; G06F 9/547
See application file for complete search history.

(56) References Cited

U.S. PATENT DOCUMENTS

| 8,688,702 B1* | 4/2014 | Chapman ............ G06F 16/2455 |
| | | 707/769 |
| 2002/0059369 A1* | 5/2002 | Kern ..................... G06Q 30/02 |
| | | 707/E17.116 |

(Continued)

FOREIGN PATENT DOCUMENTS

EP    3376387 A1    9/2018

OTHER PUBLICATIONS

International Search Report and Written Opinion for App. No. PCT/US2021/039715, date of mailing Oct. 5, 2021, 16 pages.

(Continued)

*Primary Examiner* — Piotr Poltorak
*Assistant Examiner* — Felicia Farrow
(74) *Attorney, Agent, or Firm* — Butzel Long

(57) ABSTRACT

Methods, computer readable media, and devices for efficient application programming interface (API) processing with privacy protection include one method of receiving a user request for content from a client, parsing the user request for content to identify one or more request portions having a type of public information, customized information, and personal information, transmitting the one or more request portions to a corresponding microservice based on the type of the portion of content being requested, receiving one or more response portions, determining a type of the one or more portions of content, and in response to determining the type of a portion of content is not personal information, caching the portion of content based on the type of the portion of content, combining the one or more response portions into a user response, and sending the user response to the client.

15 Claims, 3 Drawing Sheets

(56) References Cited

U.S. PATENT DOCUMENTS

| | | | | |
|---|---|---|---|---|
| 2002/0156812 A1* | 10/2002 | Krasnoiarov | ......... | H04L 67/567 |
| | | | | 707/E17.109 |
| 2015/0302098 A1* | 10/2015 | Hern | ....................... | G06F 21/41 |
| | | | | 707/708 |
| 2016/0182672 A1* | 6/2016 | Kuperman | .......... | G06F 16/9574 |
| | | | | 709/213 |
| 2017/0032146 A1* | 2/2017 | Morris | ................ | H04L 63/0407 |

OTHER PUBLICATIONS

Qian Jianwei et al: "Privacy-Preserving Selective Aggregation of Online User Behavior Data", IEEE Transactions on Computers, IEEE, USA, vol. 66, No. 2, Jan. 20, 2017 (Jan. 20, 2017), pp. 326-338, XP011638613, ISSN: 0018-9340, DOI: 10.1109/TC.2016. 2595562 [retrieved on Jan. 12, 2017.
Ashkan Yousefpour et al: "All One Needs to Know about Fog Computing and Related Edge Computing Paradigms: A Complete Survey", arxiv.org, Cornell University Library, 201 Olin Library Cornell University Ithaca, NY 14853, Aug. 15, 2018 (Aug. 15, 2018), XP081257480.
International Preliminary Report on Patentability issued in App. No. PCT/US2021/03715, mailing date Jan. 12, 2023, 9 page.

\* cited by examiner

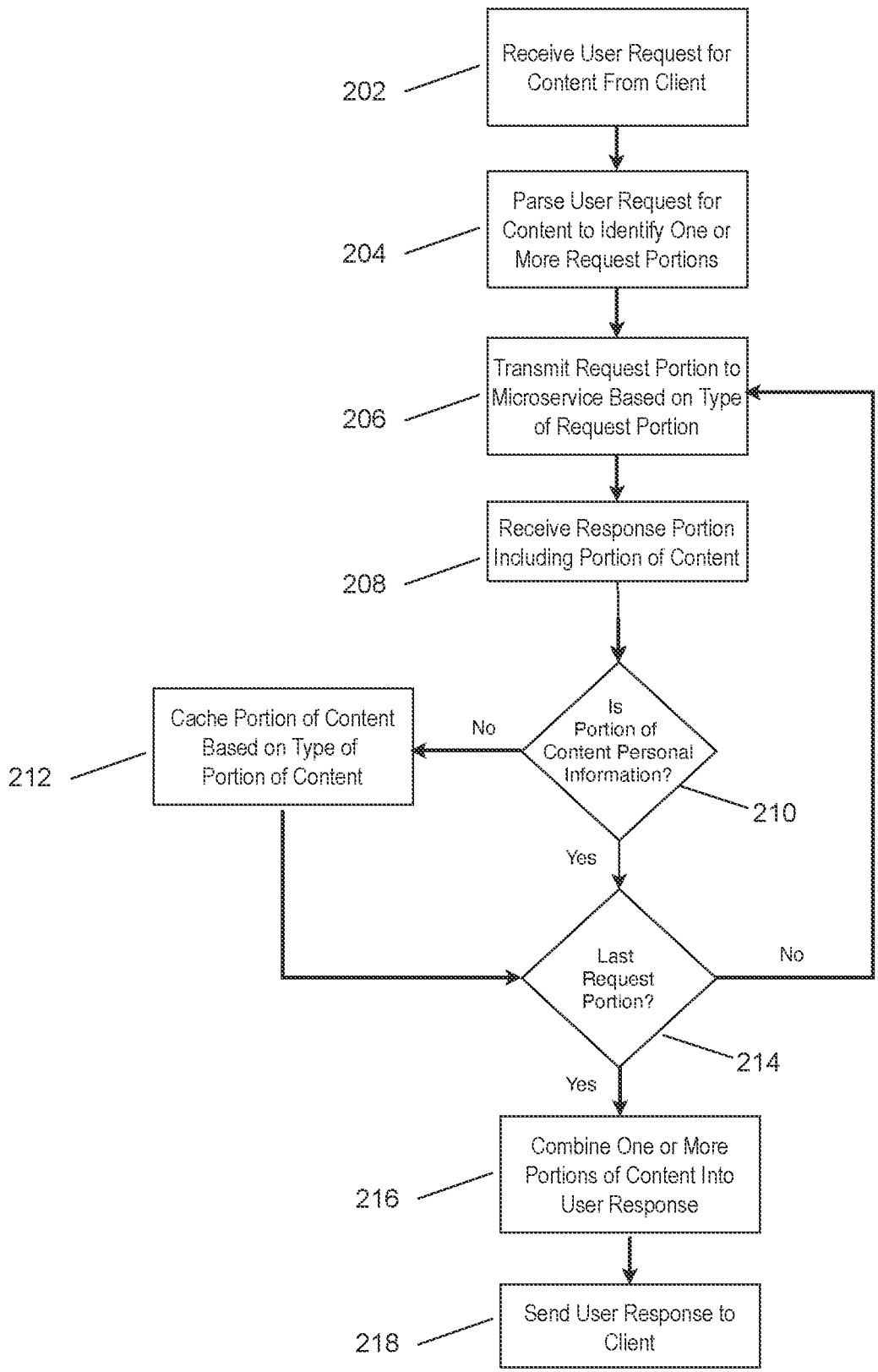

EFFICIENT API WITH PRIVACY PROTECTION

TECHNICAL FIELD

Embodiments disclosed herein relate to application programming interfaces (APIs), and in particular, to providing an efficient API with privacy protection.

BACKGROUND

Application Programming Interface (API) endpoints often are relatively simple and somewhat self-contained. For example, an API endpoint may be implemented as a web service or other means of responding to remote requests via HTTPS or similar requests that include a set of parameters that specify the desired processing by the API.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIG. 2 is a flow diagram illustrating a method for efficient API processing with privacy protections according to some example implementations.

DETAILED DESCRIPTION

Figure 1:
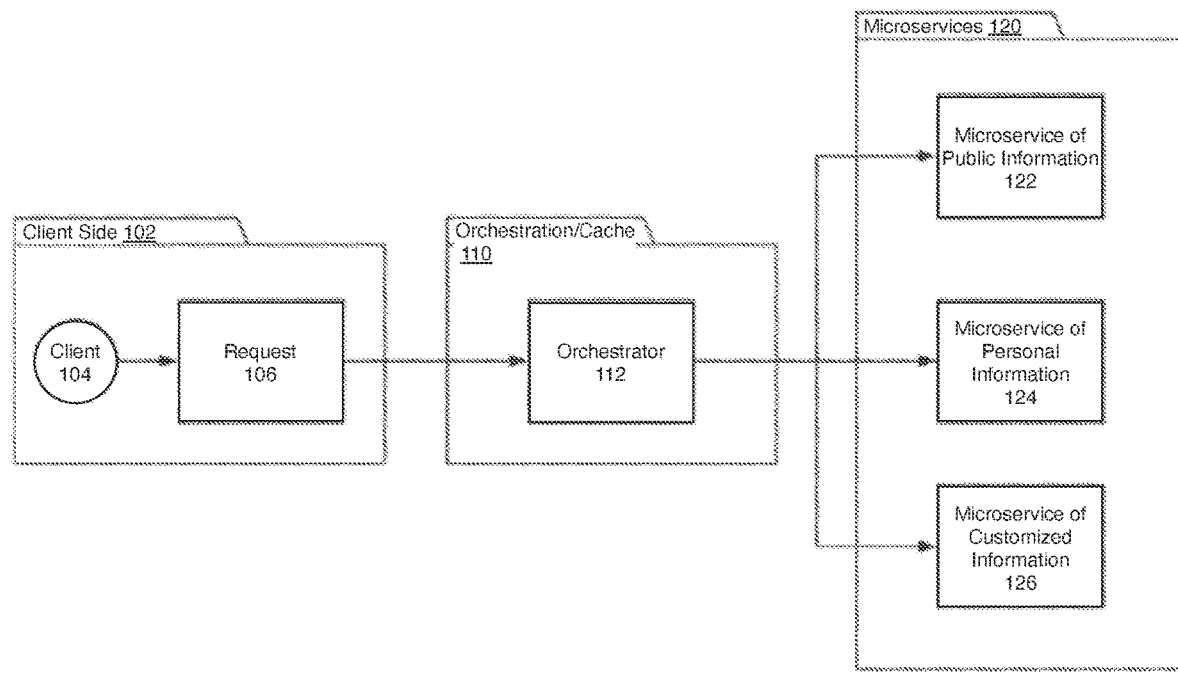
FIG. 1 is a block diagram illustrating a system for use with efficient application programming interface (API) processing with privacy protections according to some example implementations.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

The simplicity of an application programming interface (API) endpoint may represent a challenge when an API request mixes public, personal, or customized information because any response that contains a portion of customized information becomes automatically customized as a whole. Any non-customized request that contains personal information thus becomes personal. For example, a request may include a request for a portion of a product catalog and an indication of a user's previous purchase from that catalog. The catalog information itself is public or at least non-personal and non-customized, and common across many users. However, the specific user's purchase history is private information. By mixing the two together, the entire request and response becomes private and may be subject to privacy controls, regulatory access control, and the like. In many cases, responses containing personal information cannot be cached at all, leading to unnecessary duplication, processing time, bandwidth usage, and the like. Continuing the previous example, if many similar requests for a product catalog and user purchasing history are sent to a common API endpoint, because each request includes personal information the product catalog portions of the request and response may not be cached, leading to many duplicate requests to the product catalog backend that could be avoided by caching the product catalog information. It is also expected that Artificial Intelligence (AI) and context-based responses are expected to become more relevant in APIs over time, which would also benefit from separate handling and caching personal and non-personal information. To address the above and similar issues, embodiments disclosed herein provide techniques and systems that cache personal and customized information separately, such that customized information will not completely "taint" the response as customized and therefore as almost uncacheable.

To achieve this, an application programming interface (API) caching and orchestration layer is used, instead of the API endpoint being served directly with a micro-service. The layer can "understand" the different portions of personal and customized information and generates or manages separate calls to one or more backend services for each portion. This allows for each portion of data to be cached if possible, even though the final response may represent a mix of personal and customized information.

Implementations of the disclosed subject matter provide methods, computer readable media, and devices for efficient API processing with privacy protection. In various implementations, a method may include receiving a user request for content from a client and parsing the user request for content to identify one or more request portions. In some implementations, at least one request portion may represent a request for a portion of content having a type of public information, customized information, and personal information. The method may further include, for the one or more request portions, transmitting a request portion to one of a plurality of microservices based on the type of the portion of content being requested, receiving a response portion including the portion of content being requested, determining the type of the portion of content, and in response to determining the type of the portion of content is not personal information, caching the portion of content based on the type of the portion of content. The method may further include combining the one or more response portions into a user response and sending the user response to the client.

In various implementations, the method may further include, in response to determining the type of the portion of content is personal information, forgoing caching the portion of content.

In some implementations, parsing the user request for content to identify one or more request portions may include identifying the one or more request portions based on a tag associated with each request portion.

In some implementations, parsing the user request for content to identify one or more request portions may include identifying the one or more request portions based on a convention associated with each request portion.

In some implementations, caching the portion of content based on the type of the portion of content may include, in response to determining the type of the portion of content is customized information, caching the portion of content on a limited basis.

FIG. 1 shows an example system and process 100 for achieving separation of personal, customized, and/or public information. An initial request 106 is generated and sent by an end user device 104 to an expected API endpoint, orchestration/cache 110. In various implementations, end user device 104 may be part of a client side tier 102. The request 106 is received by the orchestration/cache endpoint 110, which includes an orchestrator service 112. In various implementations, orchestration/cache 110 may be part of a content distribution network (CDN) and orchestrator service 112 may be an edge worker, cache service, or other process operating within the CDN. For example, orchestrator service 112 may be software and/or hardware operating as or as part of a server within the CDN. The orchestrator service 112 identifies portions of the request 106 that require different types of information in response and routes the identified portions as requests to the appropriate microservice within microservices 120. Although a single orchestration/cache 110 including a single orchestrator 112 is shown in FIG. 1, this is only for simplicity. A single orchestration/cache 110 may include a plurality of orchestrators 112, which might be deployed or otherwise operate in a distributed fashion. Similarly, a plurality of orchestration/cache 110 may be deployed or otherwise operated in a distributed fashion, with each orchestration/cache 110 including a single orchestrator 112 or a plurality of orchestrators 112.

In various implementations, microservices 120 may include or otherwise represent one or more origin servers and/or services which may provide content in response to request 106. For example, microservices 120 may include microservice of public information 122, microservice of personal information 124, and microservice of customized information 126. Although FIG. 1 shows a single microservices 120 including a single instance each of microservice of public information 122, microservice of personal information 124, and microservice of customized information 126, this is only for simplicity. As with orchestration/cache 110 and orchestrator 112, there may be a plurality of microservices 120 and/or a plurality of any one or more of the various microservices of public, personal, and customized information.

The orchestrator service 112 may identify the different requests or request portions in a number of ways. For example, data segments may be tagged in the API as "personalized" to drive the engine with metadata. This tagging may be done by developers or may be automated based on, for example, the contents of the segments, the source of the segments, operations performed on the segments such as customization operations, and the like. As another example, conventions may indicate to the orchestrator 112 how to treat the data, such as where data obtained from public databases or other public sources is presumed by convention not to include any personal or customized information. As another example, conventions within a particular system may indicate that some data, such as common images, data that is repeated across multiple user or tenant accounts, or the like is known to be non-personal and non-customized information. As another example, the classification may be observation driven, such as where the orchestrator 112 observes repeated results and determines which aspects are relatively static and which aspects of the API return are relatively dynamic. Data then may be heuristically cached for progressively longer periods as more data is collected about how fast the data moves (e.g., static vs dynamic, global vs segmentation/user specific).

The API request 106 is thus split into multiple requests to microservices, such as microservice of public information 122, microservice of personal information 124, and microservice of customized information 126, the provide the desired information in multiple responses that are returned to the orchestrator 112. These responses also may be individually cached or otherwise manipulated before being assembled into a single response back to the requestor (e.g., client 104). For example, purely public information, such as might be provided by microservice of public information 122, may be cached relatively aggressively using any conventional caching techniques, after which it may be reused for other requests that need the same public data to provide a response. Conversely, purely private information, such as might be provided by microservice of personal information 124, may not be cached at all, and may be used only for as long as necessary to generate the final response and send it to the requestor. Customized information, such as might be provided by microservice of customized information 126, may be cached for a shorter time and/or limited to requests from a common requestor, such as where multiple requests are received from a single user, user of which uses the same or related customization data. This may be particularly useful where the customized information is not necessarily personal in nature, for example where it would not be considered to include personally identifiable information, but may be specific to the user. The customized information may be cached until a threshold period of time has elapsed and it is not expected that further requests will be received from the same user. In other cases, customized information may include truly personal information, in which case it may be treated in a similar manner to information received from the personal information microservice.

This structure also may be used in conjunction with or as part of CDN-type routing, including automated CDN routing that may be based on metadata included in the content requests handled by the CDN. The two systems may be used in conjunction as part of a multi-level cache. For example, a first-level cache may be provided by the CDN system, which provides conventional CDN-type caching of data to be delivered to end users. A second level caching may be provided by the orchestration system and microservices shown in FIG. 1. Finally, the origin servers from which the microservices shown in FIG. 1 draw data may provide a third-level cache. Such a configuration may allow for predictive techniques known for more general multi-level cache systems, while still retaining a clear separation of public, private, and customized data and allowing for appropriate caching of each type.

Embodiments disclosed herein may allow for more personalized and customized responses than are achievable with conventional API response systems. For example, a web or app page provided to a user may be highly customized based upon data known about the requestor and the request itself. For example, instead of providing a cached page or image to every visitor to a website that may be customized only on the presence of a third-party cookie or similar identifier, the public information on the page may be stitched together with personal and/or customized information, which may be based on the requestor or the request itself. For example, if a request for a user interface is received from a user that is outside a stadium where a baseball game is in progress or recently ended, the interface may be customized with an image related to one of the teams playing in the game. As another example, a request may be routed to an appropriate backend e-commerce store based upon items previously purchased by the requestor even where the request is not directed to the particular tenant that manages the identified store. The response then may be customized for the user according to information known about the user by the tenant, while still maintaining the distinction between public, private, and customized data as previously disclosed.

In this context, any user service, website, interface, or the like may be considered an API. For example, when a user accesses a website www.example.com, this may be considered an API request (a "GET" request to a URL which is the API endpoint). As previously disclosed, such a request may be directed to multiple microservices depending upon the nature of the data needed for the response. For example, if example.com is a news site, the response may include news articles and images and site images (public data), options selected by the user for his account at the site, such as which categories of news to display, geographic regions of interest, particular authors to exclude, and the like, and/or targeted information such as user-specific advertisements or similar information (customized information), and information specific to the user or his account such as email address, billing information, social media accounts, and the like (private information). In various embodiments, some data that is personalized information in one case may be private information in another, and vice-versa. For example, a targeted advertisement that is based on non-specific information such as the article being viewed may be considered personalized information, whereas a targeted advertisement that is based on a user's activity in a social media account or specific demographic information provided by the user may be considered private information even though the advertisement itself is public or customized information.

FIG. 2 illustrates a method 200 for efficient API processing with privacy protection, as disclosed herein. In various implementations, the steps of method 200 may be performed by a server, such as electronic device 300 of FIG. 3A or system 340 of FIG. 3B, and/or by software executing on a server or distributed computing platform. Although the steps of method 200 are presented in a particular order, this is only for simplicity.

In step 202, a user request for content may be received from a client. For example, an orchestrator service, such as orchestrator 112 of FIG. 1, may receive a request for content. In various implementations, such user request for content may be received by or as part of a content distribution network (CDN). For example, the orchestrator service may be implemented as an edge worker and/or some other component of a CDN.

In step 204, the user request for content may be parsed to identify one or more request portions. For example, the request for content may include a request for a portion of content that includes private information, a request for a portion of content that includes customized information, and a request for a portion of content that includes public information. In another example, the request may include only a request for a public information portion and a request for a private information portion. In yet another example, the request may include multiple requests for portions of public information and multiple requests for portions of private information. That is, any given request may represent a request for content that includes any number of different portions of the various types of information.

In various implementations, the type of content for which requests are received may include public information, customized information, and personal information. Public information may include, for example, information that is or otherwise may be made readily available to anyone (i.e., the public at large). Customized information may include, for example, information that is customized, targeted, or otherwise structured for a specific individual without personally identifying that individual. Personal information may include, for example, information that may personally identify an individual and/or that should only be presented to or otherwise protected for access by the individual.

In some implementations, the type of a portion of content being requested may be determined based on a tag or other marking associated with the request for the portion of content. For example, metadata, a tag, a parameter, and/or other marking may be included in or otherwise associated with a uniform resource locator (URL), uniform resource identifier (URI), header, and/or other element of a user request. In some implementations, the type of a portion of content being requested may be determined based on a convention or other identification known or otherwise learned about or from the request for the portion of content. For example, a request method (e.g., GET, POST, PUT), a source of content, a structure of content, a volume of content (e.g., number of times specific content was requested), or the like may be utilized to determine the type of a portion of content being requested. Such convention or other identification may be explicitly known (i.e., a specific element within or otherwise associated with the request) or implicitly learned (e.g., a volume may be learned over time).

In step 206, one of the one or more identified request portions may be transmitted to a microservice based on the type of the portion of content being requested. For example, a request portion that requests public information may be transmitted to a microservice providing public information, such as microservice of public information 122 of FIG. 1. As another example, a request portion that requests private information may be transmitted to a microservice providing private information, such as microservice of personal information 124 of FIG. 1. Similarly, a request portion that requests customized information may be transmitted to a microservice providing customized information, such as microservice of customized information 126 of FIG. 1.

In step 208, a response portion including the requested portion of content may be received. For example, a response including a portion of public information may be received from a public information microservice.

In determination step 210, a determination of whether the received portion of content is personal information may be made. If the received portion of content is personal information (i.e., determination step 210="Yes"), the method may continue to determination step 214. If the received portion of content is not personal information (i.e., determination step 210="No"), the method may continue to step 212.

In step 212, the received portion of content may be cached based on the type of the received portion. For example, if the received portion of content is public information, then the portion of content may be cached aggressively (e.g., maintained in cache for an extended period of time). As another example, if the received portion of content is customized information, then the portion of content may be cached on a more selective basis (e.g., maintained in cache for a limited period of time). Of note, as a result of the combination of determination step 210 and step 212, personal information may not be cached while public information and customized information may be cached to varying degrees.

In determination step 214, a determination of whether the one requested portion of content is the last requested portion may be made. If there is another portion of content to be requested (i.e., determination step 214="No"), the method may return to step 206 in which the next request portion may be transmitted to a microservice. If there is not another request portion (i.e., determination step 214="Yes"), the method may proceed to step 216.

In step 216, the one or more portions of received content may be combined into a user response. For example, the various portions of public, personal, and/or customized information may be collected into a single response.

In step 218, the user response may be sent to the client. For example, the collection of public, personal, and/or customized information may be transmitted to the client making the original request, such as client 104 of FIG. 1.

In this way, a single request for content may be subdivided into corresponding portions based on the type of content portions being requested. In turn, each type of content portion may be handled in a corresponding way, thus enabling varying degrees of caching and otherwise reducing load on various origin services. This allows for improved performance of computing systems as well as an improved user experience.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 3A:
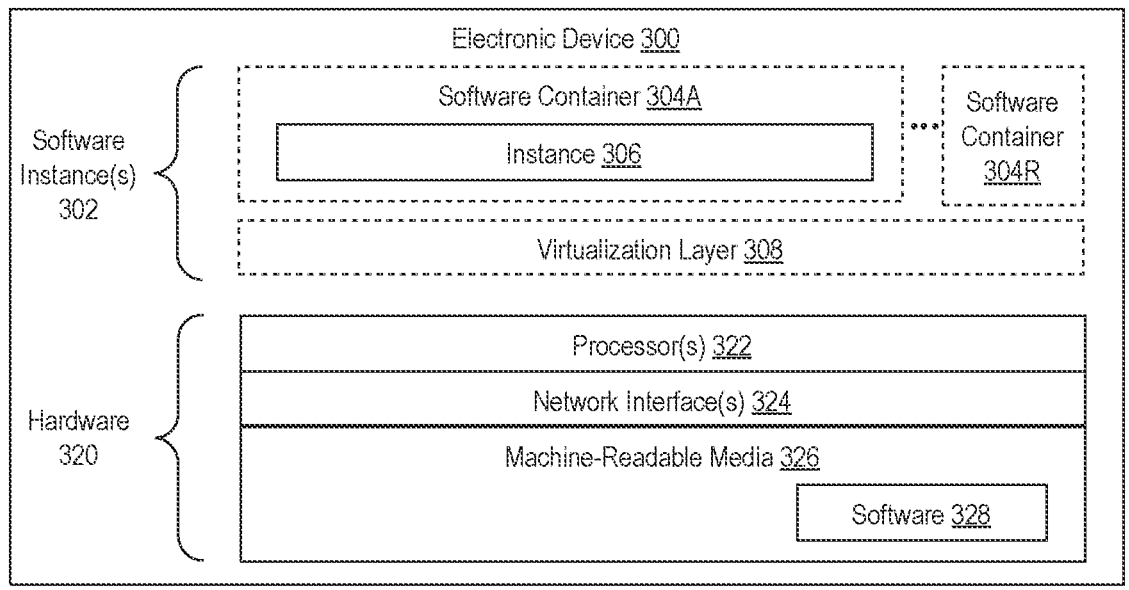
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and consolidated order manager may be implemented in one or more electronic devices 300.

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

Figure 3B:
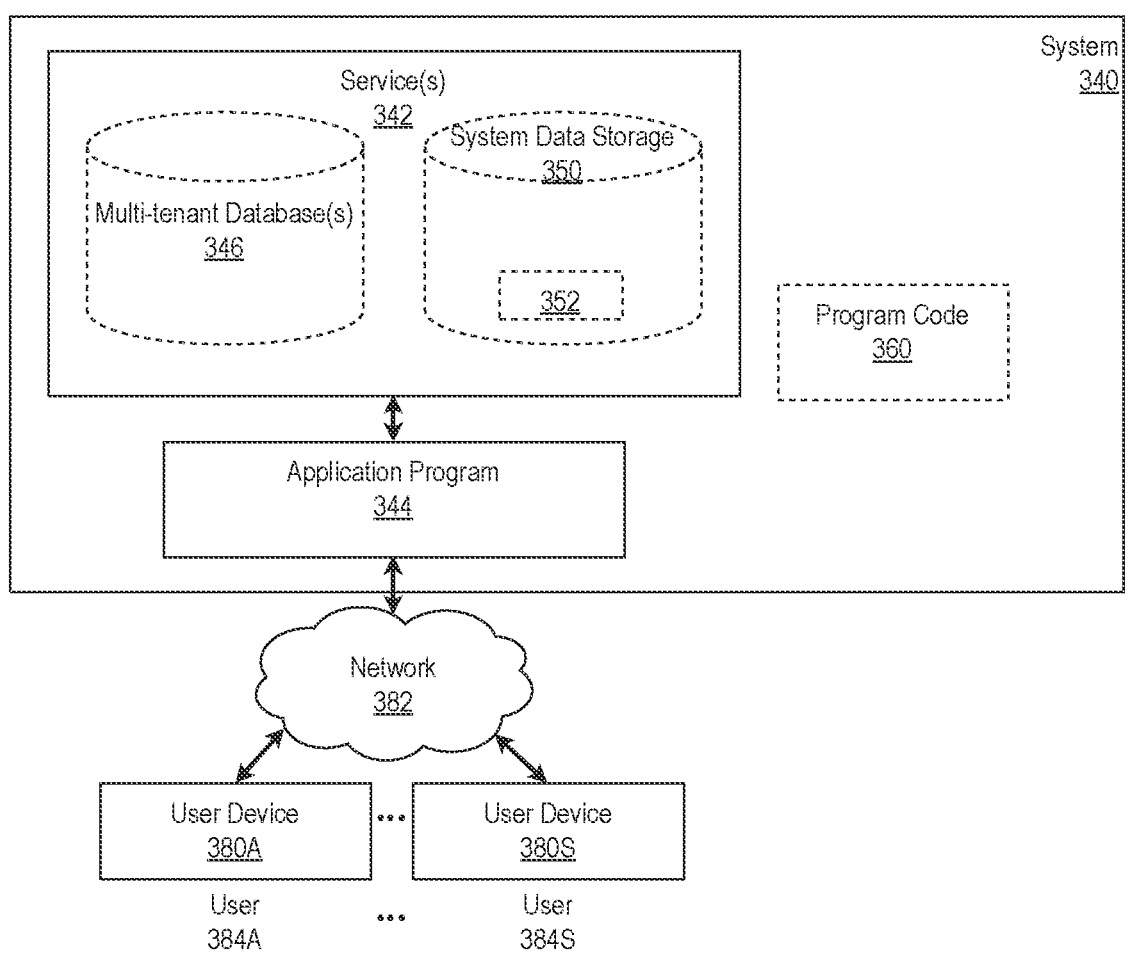
FIG. 3B is a block diagram of a deployment environment according to some example implementations.

FIG. 3B is a block diagram of a deployment environment according to some example implementations. A system 340 includes hardware (e.g., a set of one or more server devices) and software to provide service(s) 342, including a consolidated order manager. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services.

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: Customer relationship management (CRM); Configure, price, quote (CPQ); Business process modeling (BPM); Customer support; Marketing; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the framework for modeling heterogeneous feature sets, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method for efficient application programming interface (API) processing with privacy protection, the method comprising:
    receiving a combined user request for content from a client;
    parsing the combined user request for content to identify a first request portion for public information, a second request portion for customized information that is customized or targeted or structured for the specific individual and that can be retrieved without personally identifying the specific individual, and a third request portion for personal information that personally identifies an individual or is presented to the individual or is protected for access by the individual, wherein parsing the user request for content to identify one or more request portions comprises: identifying the one or more request portions based on a convention associated with each request portion, the convention being learned about or from the request for the portion of content based on a number of times the content is requested;
    subdividing the combined user request into the corresponding request portions based on the type of content portions being requested;
    transmitting separately the first request portion, the second request portion that is customized or targeted or structured for the specific individual and that can be retrieved without personally identifying the specific individual, and the third request portion to one of a plurality of microservices based on the type of the portion of content being requested;
    receiving separately a first response portion comprising the public information, a second response portion comprising the customized information that is customized or targeted or structured for the specific individual and that can be retrieved without personally identifying the specific individual, and a third response portion comprising the personal information;
    determining the type of the portion of content; and
    in response to determining the type of the portion of content is not personal information, separately caching the portion of content based on the type of the portion of content;
    combining the first response portion, the second response portion, and the third response portion into a combined user response; and
    sending the combined user response to the client.

2. The computer-implemented method of claim 1, further comprising:
    in response to determining the type of the portion of content is personal information, forgoing caching the portion of content.

3. The computer-implemented method of claim 1, wherein parsing the user request for content to identify one or more request portions comprises:
    identifying the one or more request portions based on a tag associated with each request portion.

4. The computer-implemented method of claim 1, wherein caching the portion of content based on the type of the portion of content comprises:
    in response to determining the type of the portion of content is customized information, caching the portion of content on a limited basis.

5. A non-transitory machine-readable storage medium that provides instructions that, if executed by a processor, are configurable to cause the processor to perform operations comprising:
    receiving a combined user request for content from a client;
    parsing the combined user request for content to identify a first request portion for public information, a second request portion for customized information that is customized or targeted or structured for the specific individual and that can be retrieved without personally identifying the specific individual, and a third request portion for personal information that personally identifies an individual or is presented to the individual or is protected for access by the individual, wherein parsing the user request for content to identify one or more request portions comprises: identifying the one or more request portions based on a convention associated with each request portion, the convention being learned about or from the request for the portion of content based on a number of times the content is requested;
    subdividing the combined user request into the corresponding request portions based on the type of content portions being requested;

transmitting separately the first request portion, the second request portion that is customized or targeted or structured for the specific individual and that can be retrieved without personally identifying the specific individual, and the third request portion to one of a plurality of microservices based on the type of the portion of content being requested;

receiving separately a first response portion comprising the public information, a second response portion comprising the customized information that is customized or targeted or structured for the specific individual and that can be retrieved without personally identifying the specific individual, and a third response portion comprising the personal information;

determining the type of the portion of content; and in response to determining the type of the portion of content is not personal information, separately caching the portion of content based on the type of the portion of content;

combining the first response portion, the second response portion, and the third response portion into a combined user response; and sending the combined user response to the client.

6. The non-transitory machine-readable storage medium of claim 5, wherein the operations further comprise:

in response to determining the type of the portion of content is personal information, forgoing caching the portion of content.

7. The non-transitory machine-readable storage medium of claim 5, wherein parsing the user request for content to identify one or more request portions comprises:

identifying the one or more request portions based on a tag associated with each request portion.

8. The non-transitory machine-readable storage medium of claim 5, wherein caching the portion of content based on the type of the portion of content comprises:

in response to determining the type of the portion of content is customized information, caching the portion of content on a limited basis.

9. An apparatus comprising:

a processor; and a non-transitory machine-readable storage medium that provides instructions that, if executed by a processor, are configurable to cause the processor to perform operations comprising:

receiving a combined user request for content from a client;

parsing the combined user request for content to identify a first request portion for public information, a second request portion for customized information that is customized or targeted or structured for the specific individual and that can be retrieved without personally identifying the specific individual, and a third request portion for personal information that personally identifies an individual or is presented to the individual or is protected for access by the individual, wherein parsing the user request for content to identify one or more request portions comprises: identifying the one or more request portions based on a convention associated with each request portion, the convention being learned about or from the request for the portion of content based on a number of times the content is requested;

subdividing the combined user request into the corresponding request portions based on the type of content portions being requested;

transmitting separately the first request portion, the second request portion that is customized or targeted or structured for the specific individual and that can be retrieved without personally identifying the specific individual, and the third request portion to one of a plurality of microservices based on the type of the portion of content being requested;

receiving separately a first response portion comprising the public information, a second response portion comprising the customized information that is customized or targeted or structured for the specific individual and that can be retrieved without personally identifying the specific individual, and a third response portion comprising the personal information;

determining the type of the portion of content; and in response to determining the type of the portion of content is not personal information, separately caching the portion of content based on the type of the portion of content;

combining the first response portion, the second response portion, and the third response portion into a combined user response; and sending the combined user response to the client.

10. The apparatus of claim 9, wherein the operations further comprise:

in response to determining the type of the portion of content is personal information, forgoing caching the portion of content.

11. The apparatus of claim 9, wherein parsing the user request for content to identify one or more request portions comprises:

identifying the one or more request portions based on a tag associated with each request portion.

12. The apparatus of claim 9, wherein caching the portion of content based on the type of the portion of content comprises:

in response to determining the type of the portion of content is customized information, caching the portion of content on a limited basis.

13. The computer-implemented method of claim 1, wherein the separately caching comprises separately caching a first portion of the content comprising public information for repeated reuses by multiple tenants, and a second portion of the content comprising customized information until a threshold period of time elapses.

14. The non-transitory machine-readable storage medium of claim 5, wherein the separately caching comprises separately caching a first portion of the content comprising public information for repeated reuses by multiple tenants, and a second portion of the content comprising customized information until a threshold period of time elapses.

15. The apparatus of claim 9, wherein the separately caching comprises separately caching a first portion of the content comprising public information for repeated reuses by multiple tenants, and a second portion of the content comprising customized information until a threshold period of time elapses.

* * * * *